(12) United States Patent
Khozikov et al.

(10) Patent No.: US 9,670,913 B2
(45) Date of Patent: Jun. 6, 2017

(54) PLASMA ACTUATING PROPULSION SYSTEM FOR AERIAL VEHICLES

(71) Applicant: The Boeing Company, Chicago, IL (US)

(72) Inventors: Vyacheslav Khozikov, Bellevue, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 14/577,260

(22) Filed: Dec. 19, 2014

(65) Prior Publication Data

US 2016/0169214 A1    Jun. 16, 2016

Related U.S. Application Data

(62) Division of application No. 13/346,467, filed on Jan. 9, 2012, now Pat. No. 8,944,370.

(51) Int. Cl.
| | |
|---|---|
| *F03H 1/00* | (2006.01) |
| *B64C 39/02* | (2006.01) |
| *H05H 1/24* | (2006.01) |
| *H05H 1/54* | (2006.01) |
| *B64D 27/24* | (2006.01) |
| *B64C 23/00* | (2006.01) |

(52) U.S. Cl.
CPC ........... *F03H 1/0081* (2013.01); *B64C 39/02* (2013.01); *B64C 39/028* (2013.01); *B64D 27/24* (2013.01); *F03H 1/0012* (2013.01); *F03H 1/0037* (2013.01); *H05H 1/2406* (2013.01); *H05H 1/54* (2013.01); *B64C 23/005* (2013.01); *H05H 2001/2412* (2013.01); *H05H 2001/2431* (2013.01); *H05H 2001/2462* (2013.01)

(58) Field of Classification Search
CPC ... H05H 2001/2462; H05H 2001/2468; H05H 2001/2431; H05H 2001/2412; H05H 1/54; F03H 1/00; F03H 1/0081
See application file for complete search history.

(56) References Cited

U.S. PATENT DOCUMENTS

| | | | |
|---|---|---|---|
| 8,251,318 B2 * | 8/2012 | Khozikov | B64C 21/10 244/205 |
| 8,502,108 B2 * | 8/2013 | Mohamed | H05H 1/48 219/121.5 |
| 9,145,874 B2 * | 9/2015 | Slough | F03H 1/0081 |
| 2004/0247886 A1 * | 12/2004 | Kudo | B05D 1/62 428/421 |

* cited by examiner

*Primary Examiner* — Brian M O'Hara
(74) *Attorney, Agent, or Firm* — Felix L. Fischer

(57) ABSTRACT

A plasma propulsion nozzle incorporates a cylinder having an inlet and an outlet. A plurality of substantially cylindrical planarly disbanded electrodes with sandwiched dielectric spacers is cascaded in an array to be concentrically expanding from the inlet through an interior chamber to the outlet for a nozzle. A voltage source applies aperiodic signal with rapidly reversing polarity to the electrodes with differential phase applied to adjacent electrodes in the array creating and expelling plasma clusters at each dielectric spacer inducing flow from the nozzle outlet to produce thrust.

15 Claims, 8 Drawing Sheets

PLASMA ACTUATING PROPULSION SYSTEM FOR AERIAL VEHICLES

REFERENCE TO RELATED APPLICATIONS

This application is a division of application Ser. No. 13/346,467 filed on Jan. 9, 2012 having the same title as the present application and having a common assignee, the disclosure of which is incorporated herein by reference.

BACKGROUND INFORMATION

Field

Embodiments of the disclosure relate generally to the field aircraft propulsion and more particularly to cylindrically concentric dielectric barrier discharge electrodes incorporated in a nozzle for inducing momentum change by plasma creation and expulsion in a propulsive airflow for thrust generation.

Background

Light weight unmanned aerial vehicles (UAVs) are being employed in numerous observation, surveying and mapping tasks. In certain cases for a small or micro-/nano-UAV (uAV/nAV) the operating envelope presumes a part of a mission to be conducted at the low or extremely low altitudes (sub-meter to several meters). The operational requirements typically further require a propulsion mechanism which operates in a quiet and hardly detectable manner. Traditional and advanced means of providing power for such uAV and nAV applications include improved turboprops and flapping wings. Such systems can be mechanically complex and require power transformation (electrical to mechanical) using several stages. Plasma propulsion system consisting of a single dielectric-barrier discharge unit have been employed but lack efficiency and power It is therefore desirable to provide an efficient propulsion plant for a small UAV. It is also desirable to provide a propulsion mechanism which would operate in a quiet and hardly detectable manner.

SUMMARY

Embodiments disclosed herein provide a dielectric barrier discharge device for accelerating an air flow for propelling a vehicle which incorporates a nozzle having upstream and downstream ends. A dielectric barrier layer is present along the entire inside periphery of the nozzle. A first annular electrode extends around the inside periphery of the upstream end of the nozzle and external to the dielectric barrier layer. A second annular electrode extends around the inside periphery of the nozzle, downstream of the first annular electrode, and internal to the dielectric barrier layer. A plurality of annular electrodes extends around the inside periphery of the nozzle, downstream of the first and second annular electrodes, internal to the dielectric barrier layer, and in a cascading array terminating at the nozzle downstream end.

In one example a plasma propulsion nozzle incorporates a cylinder having an inlet and an outlet. A plurality of substantially cylindrical planarity disbanded electrodes with sandwiched dielectric spacers is cascaded in an array to be concentrically expanding from the inlet through an interior chamber to the outlet for a nozzle. A voltage source applies a periodic signal with rapidly reversing polarity to the electrodes with differential phase applied to adjacent electrodes in the array creating and expelling plasma clusters at each dielectric spacer inducing flow from the nozzle outlet to produce thrust.

An unmanned air vehicle may be created with the embodiment employing a blended wing body and attaching at least one plasma propulsion nozzle incorporating a cylinder having an inlet and an outlet. A plurality of substantially cylindrical planarly disbanded electrodes with sandwiched dielectric spacers is cascaded in an array to be concentrically expanding from the inlet through an interior chamber to the outlet for a nozzle. A voltage source applies a periodic signal with rapidly reversing polarity to the electrodes with differential phase applied to adjacent electrodes in the array creating and expelling plasma clusters at each dielectric spacer inducing flow from the nozzle outlet to produce thrust.

In a method to produce thrust using the embodiments, air is introduced through the inlet into the interior chamber of the nozzle. A periodic voltage signal is applied to provide a differential voltage between paired electrodes in adjacent plasma generation units. Torroidal plasma clusters are created at each plasma generation unit in a first phase and expelled in a second phase introducing momentum change into the air in the interior chamber for exit through the nozzle outlet.

The features, functions, and advantages that have been discussed can be achieved, independently in various embodiments of the present disclosure or may be combined in yet other embodiments further details of which can be seen with reference to the following description and drawings.

DETAILED DESCRIPTION

Embodiments disclosed herein provide a dielectric-barrier discharge phenomena-based device incorporating a cascade of the plasma actuating electrodes concentrically arranged in a nozzle with an inlet and outlet to generate ionic plasma during a first operational stage and to move the plasma clusters providing thrust during a second operational stage. The second stage provides a fast polarity change in the electrodes which directionally accelerates plasma clusters, thereby producing thrust through ionic wind. This process of altering the stages is repeated at the rate 0.01-30 kHz, providing a steady ionic flow from the thruster nozzle. A relatively low, but wide range of velocity (1-15 m/s) from the thruster provides primary propulsion for a small (micro- or nano-) UAV. The nozzle system provides a silent, reduced footprint solution for any application that may require non-disturbing or undetectable operations through altitudes from less than a meter up to between one and two thousands of meters. The efficiency of the thruster is increased due to regulation of power consumption according to the operating envelope through adjusting applied power for the desired intensity of the ionic flow, or manipulating a duty cycle. An effect of the bulk generating of plasma by a cascade of electrodes significantly increases ionic flow compared to a configuration with a single pair of electrodes.

Figure 1:
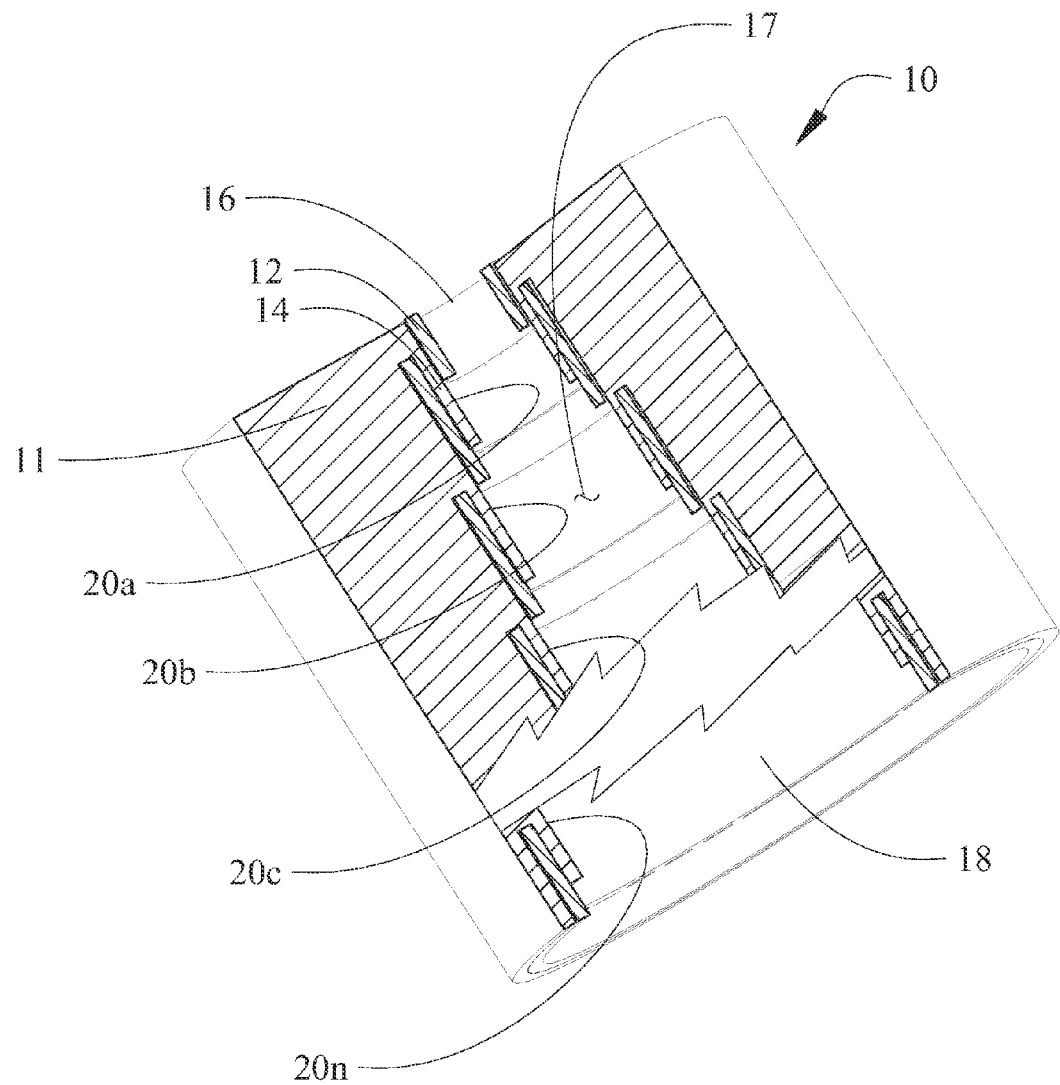
FIG. 1 is an isometric view with a 90-degrees cross-section of a cascaded array of electrodes configured cylindrically iB a plasma propulsion nozzle
Figure 2:
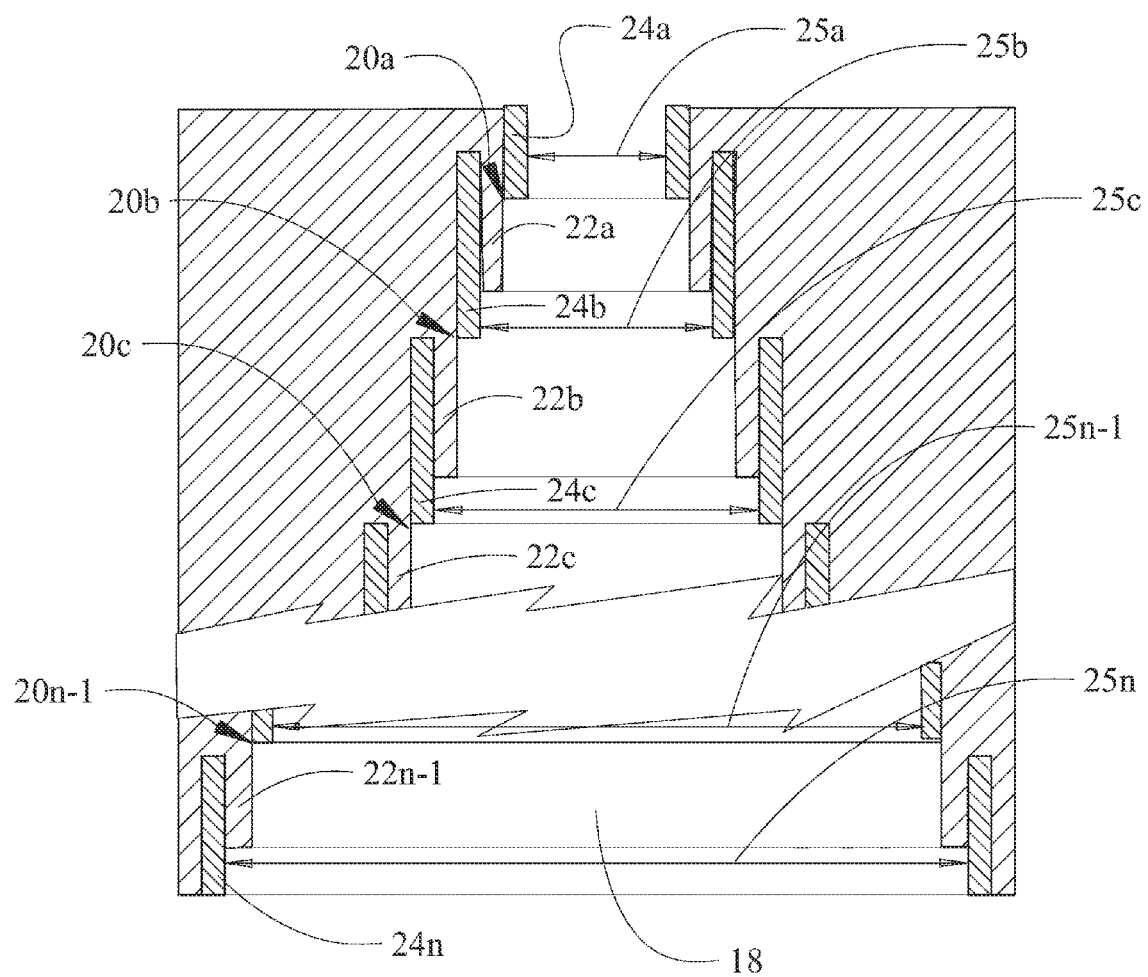
FIG. 2 is a side section view of the plasma propulsion nozzle of FIG. 1.

Referring to the drawings, FIG. 1 shows a cylindrical plasma propulsion nozzle 10 with a dielectric barrier 11 having planarly disbanded annular electrodes 12 with sandwiched dielectric spacers 14 cascaded to be concentrically expanding from an inlet 16 through an interior chamber 17 to an outlet 18 for the nozzle. Typical thickness of the dielectric spacers varies from several tens to several hundreds of microns (~20 microns 200 microns). The electrodes, including the portions buried within the dielectric spacers, have typical thickness of several hundreds of microns to a millimeter (~200 microns-1 mm). Each electrode and dielectric pair in the cascade constitutes a plasma generation unit $20a$, $20b$, $20c$-$20n$ for creating a plasma field. As shown in FIG. 2, the cascaded array of plasma generators may be constructed so that for plasma generation unit $20a$, dielectric $22a$ is sandwiched between the electrodes $24a$ and $24b$, for plasma generation unit $20b$, the dielectric $22b$ is sandwiched between the electrodes $24b$ and $24c$, and so on to dielectric $22n$-1 which is sandwiched between electrodes $24n$-1 and $24n$. In the example shown in FIG. 2, the electrodes are slightly longer than the associated dielectric. The cascaded electrodes with interspersed dielectric results in increasing diameters, $25a$, $25b$, $25c$, $25d$-$25n$ at each plasma generation unit. While shown as cylindrical with expansion based on thicknesses of the electrodes and dielectric layers, the electrodes and interspersed dielectric layers may be non-planar and/or of varying length and thickness for optimizing plasma generation and expulsion and to provide a varying profile for the interior chamber 17 from inlet 16 to outlet 18 in alternative embodiments.

Generation of plasma clusters from air entering through the inlet 16 occurs at each plasma generation unit $20a$, $20b$, $20c$-$20n$ by application of a differential voltage to the electrode associated with the generation unit and its pair electrode as will be described in greater detail subsequently. While the embodiments are describe herein with respect to an open air inlet, alternative supplied gaseous fluid may be employed in a closed system. As shown in Ha 3A, substantially toroidal, or ring like, plasma clusters $26a$, $26b$, $26c$-$26n$-1 form over each dielectric $22a$, $22b$, $22c$-$22n$-1 of each plasma generation unit. The electrodes are grouped with an immediately adjacent electrode in pairs $28a$, $28b$, $28c$-$28n$. Application of a voltage differential to the electrode pairs in a periodic signal with rapidly reversing polarity creates an expulsion of the plasma clusters which are then moved towards the outlet of the nozzle and outside generating momentum transfer to the surrounding air during a second phase of the signal as shown notionally in FIG. 3B with the expelled plasma clusters shown as $26a'$, $26b'$, $26c'$-$26n$-$1'$ creating induced, airflow through the nozzle.

Figure 4:
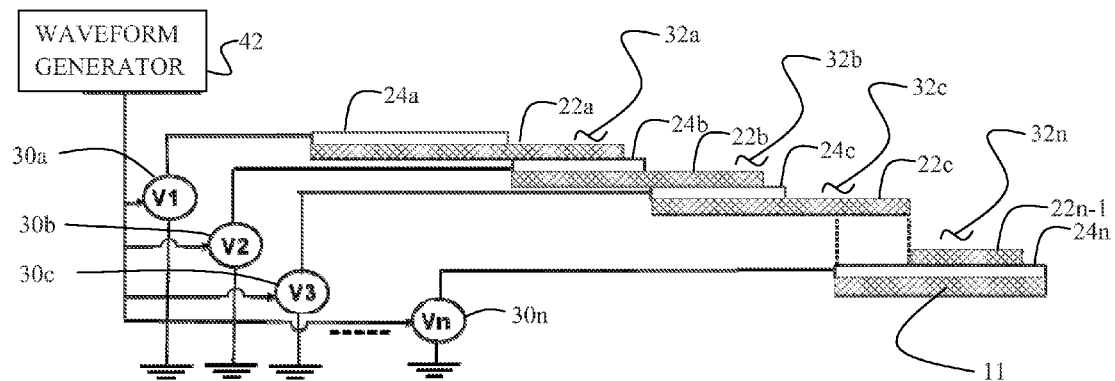
FIG. 4 is a schematic representation of a first embodiment for voltage supply to the electrode array.
Figure 5:
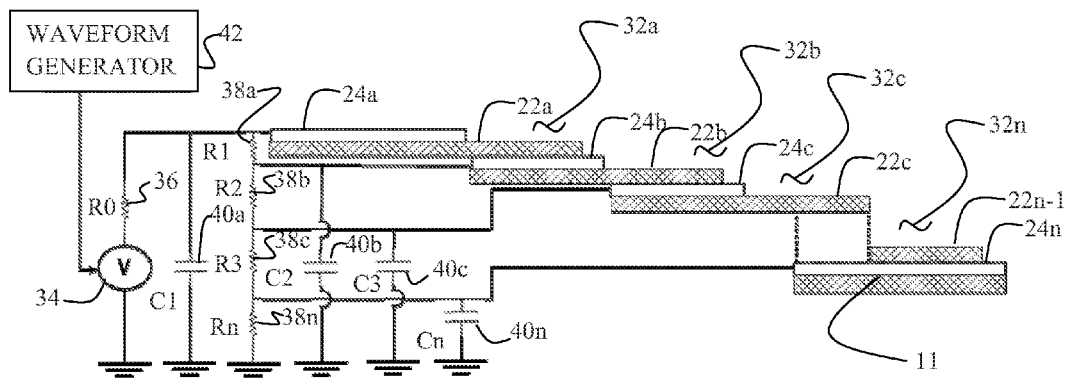
FIG. 5 is a schematic representation of a second embodiment for voltage supply to the electrode array.

Referring to FIGS. 4 and 5, application of voltage to the electrodes is accomplished whereby the electrodes $24a$ and $24b$ in electrode pair $28a$ may define a voltage relative to one another across the dielectric $22a$ based on voltage V1 from voltage supply $30a$ and voltage V2 from voltage supply $30b$.

Figure 3A:
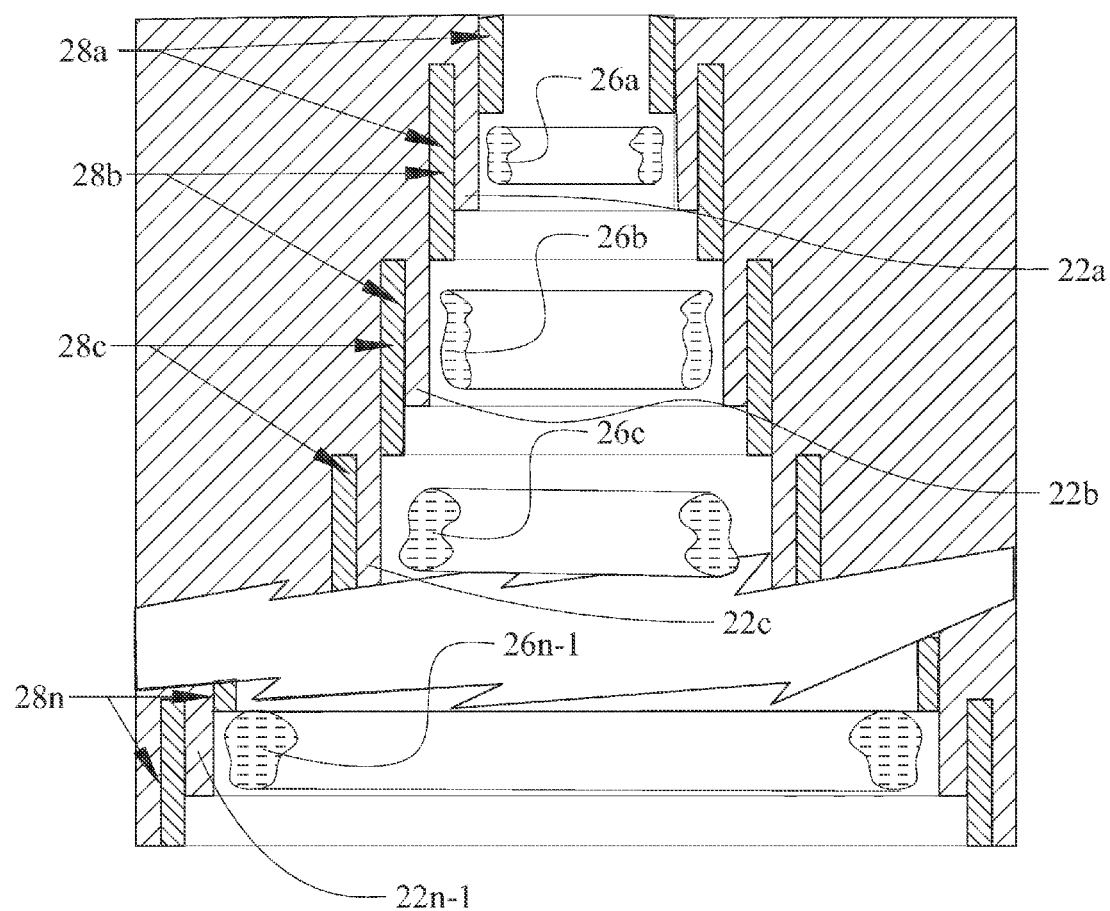
FIG. 3a is aside section view pictorially demonstrating plasma formation on the electrode array.

In response to a first phase (or half) of a cycle of this voltage, gas or air proximate the area $32a$ may ionize, to form a plasma cluster $26a$ as shown and described with respect to FIG. 3A.

In a similar manner, the electrodes $24b$ and $24c$ in electrode pair $28b$ may define a voltage across the dielectric $22b$ based on voltage V2 from supply $30b$ and V3 from supply $30c$, causing generation of the plasma cluster $26b$ as shown and described with respect to FIG. 3A. The voltage variation continues for the electrode pairs $28c$-$28n$ wherein the electrodes $24n$ and the previous electrode $24n$-1 (not shown) may define a voltage across the dielectric $22n$-1, causing generation of the plasma cluster $26n$-1 as shown and described with respect to FIG. 3A.

Figure 3B:
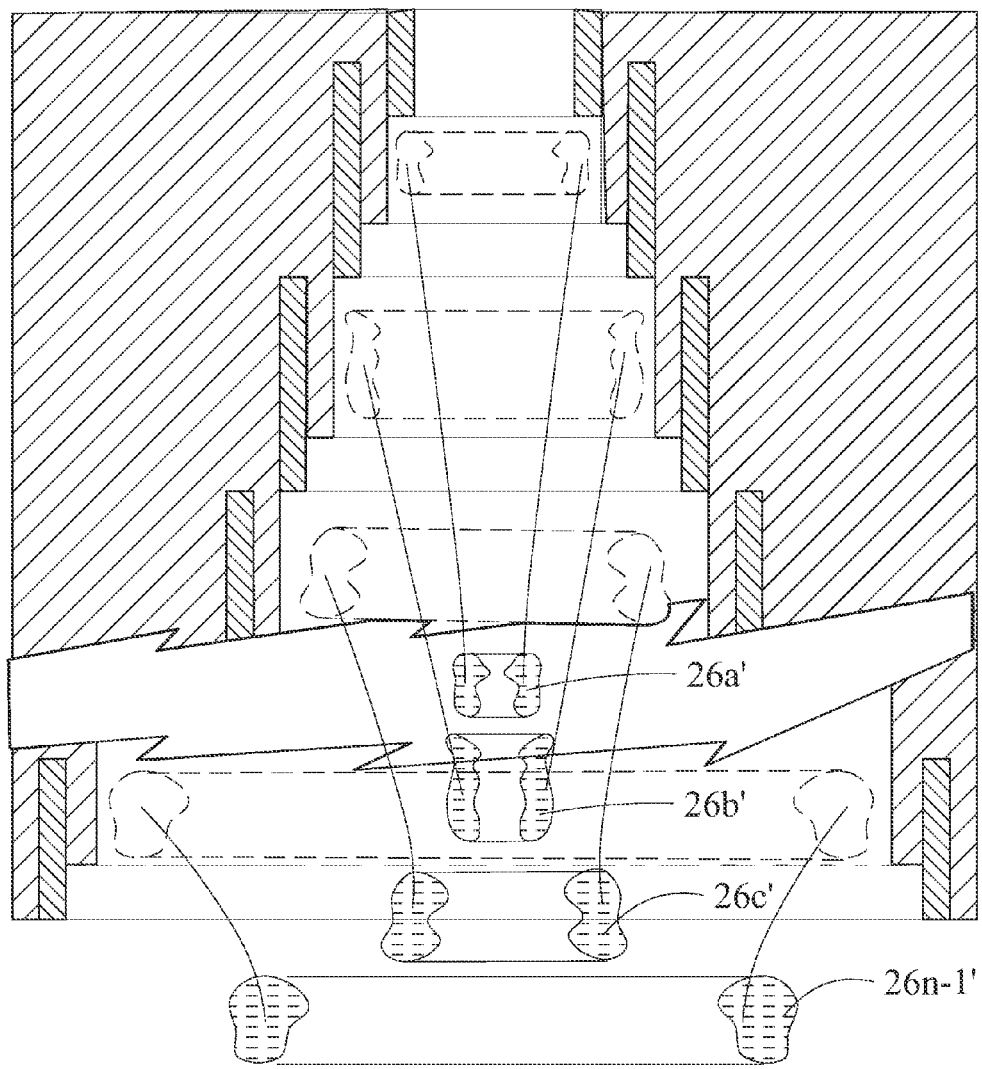
FIG. 3b is a side section view pictorially demonstrating plasma expulsion by the electrode array.

For example, with respect to FIG. 4 assuming a periodic input waveform from voltage sources $30a$-$30n$ that represents variable power source phase offset each alternate voltage source to provide the desired voltage differential between electrode pairs, the formation of clusters shown in FIG. 3A may occur during one phase of the power source, while the expulsion of the clusters shown in FIG. 3B may occur during a subsequent phase of the power source. In one example, an alternating-current (AC) power source is employed.

An alternative power source network for voltage input to the electrodes shown in FIG. 5 allows aperiodic waveform generated by a single voltage source 34 to be phase adjusted for each electrode pair using appropriate resistors R0, 36, R1, $38a$, R2, $38b$, R3, $38c$ to Rn, $38n$ and associated aggregated capacities C1, $40a$, C2, $40b$, C3, $40c$ through Cn, $40n$. For phase adjustment, alternative circuit networks such as a resistor/inductor network, or resistor/capacitor/inductor network may be employed as passive networks. Alternatively, a phase delay can be implemented using an actively controlled electronic circuit. The power networks in Ms. 4 and 5 are merely examples and not intend to limit the scope encompassed by the disclosed embodiments.

For an exemplary embodiment, the voltage supplies $30a$-$30n$ or the voltage source 34 are high voltage supplies and several hundred volts to several kilovolts (~200V-2 kV) are applied across the electrode pairs providing a high voltage signal with a frequency of 0.01-30 kHz. Electrode pairs can be activated selectively such that the intensity of the outflow and resulting thrust can be regulated. Timing of accelerating the clusters away from their origin is regulated by a control system 42 such as a wave generator which controls the voltage output of the voltage source(s). The control system may also select and supply the profile of the cyclic voltage to be applied.

The input waveforms may take forms other than a sinusoidal AC input, without departing from the scope and spirit of this description. Examples of such other forms may include, but are not limited to rectangular waveforms, sawtoothed waveforms, triangular waveforms, waveforms having non-uniform or non-standard duty cycles, and other waveforms not specifically illustrated herein. In general, different waveforms may be chosen or customized as suitable for the circumstances of particular implementation scenarios to achieve particular predefined plasma generating and displacement effects.

Figure 6A:
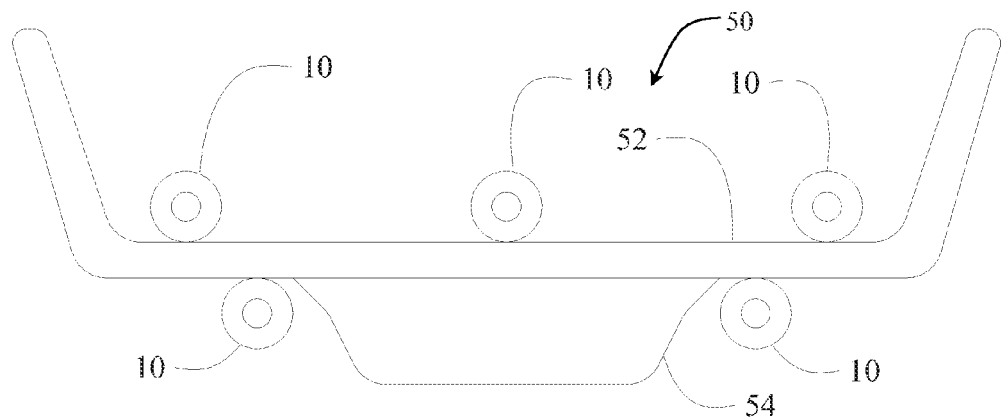
FIGS. 6A-6E are rear views of exemplary installations of plasma propulsion nozzles as embodied in FIG. 1 on a micro UAV.
Figure 6B:
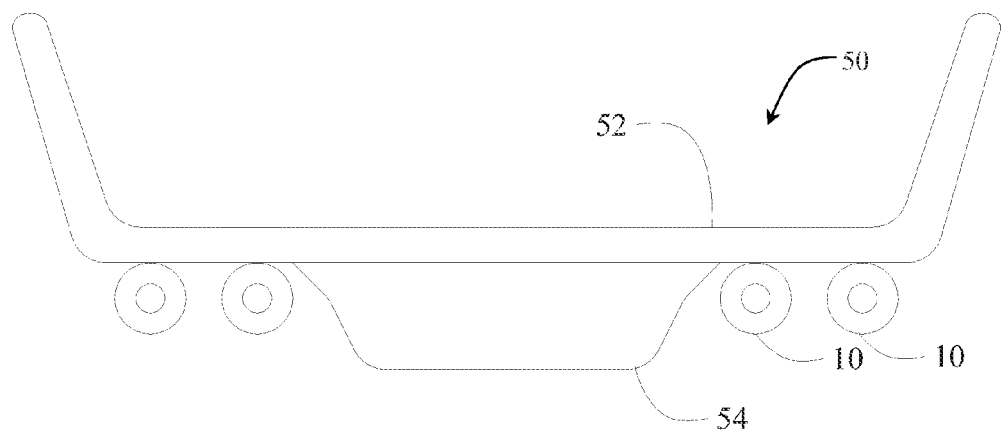
Figure 6C:
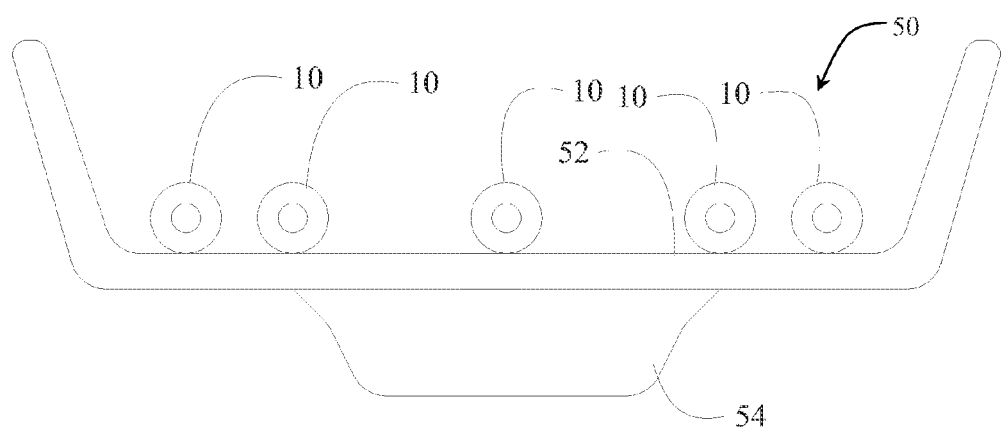
Figure 6D:
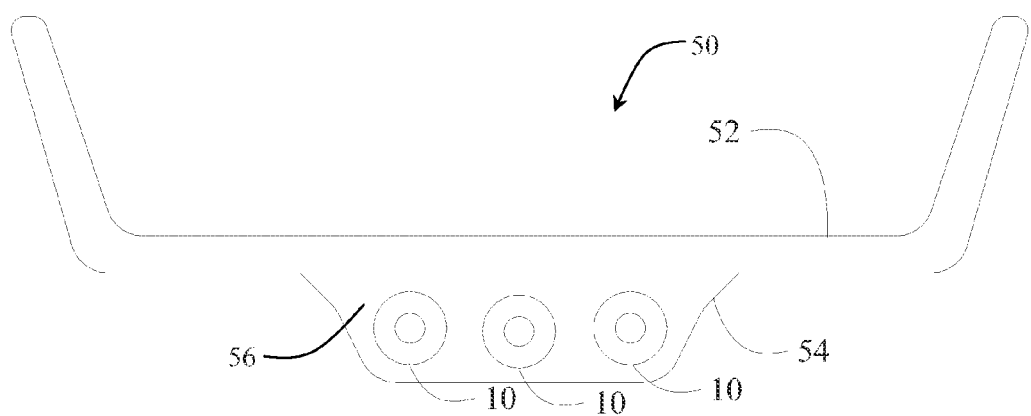

Installation of one or more plasma propulsion nozzles 10 on a uAV or nAV may be accomplished as shown in FIGS. 6A-6E for a notional airframe 50. Viewed from the rear, the nozzles 10 may be mounted on an upper surface above or a lower surface below wings 52 extending from a blended wing body fuselage 54 as shown in FIGS. 6A-6C, or housed internally in a nozzle bay 56 in the fuselage as shown in FIG.

Figure 6E:
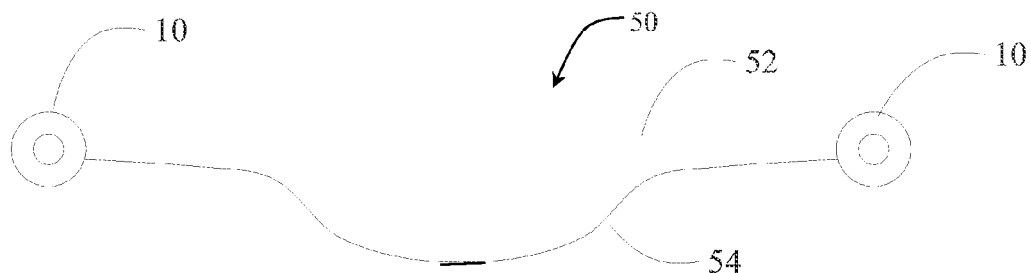

6D or with two plasma propulsion nozzles on the wing tips as shown in FIG. 6E. The plasma propulsion nozzles may be the only source of thrust for the air vehicle or may be used in combination with conventional propulsion systems to provide stealth mode operation in which the convention propulsion units are deactivated.

Figure 7:
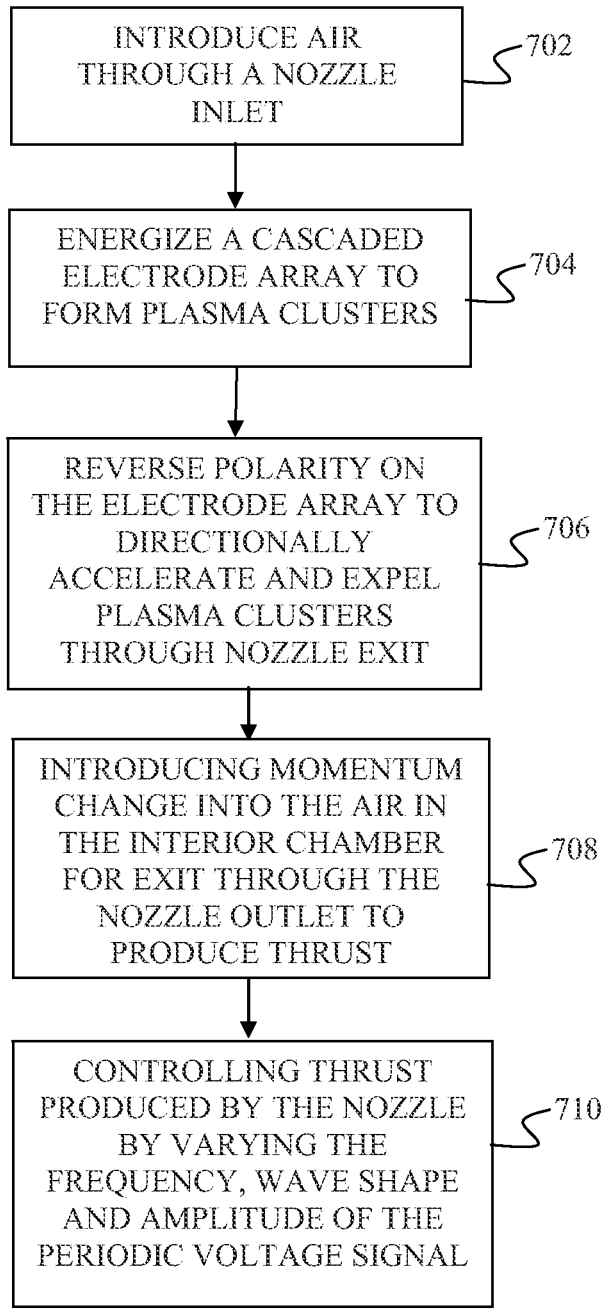
FIG. 7 is a flow chart of the method of operation of a plasma propulsion nozzle as embodied in FIG.

Operation of the plasma propulsion nozzle is shown in FIG. 7. Air is introduced through an inlet into the interior chamber of the nozzle, step 702. A periodic voltage signal is applied to provide a differential voltage between paired electrodes in adjacent plasma generation units to create torroidal plasma clusters at each plasma generation unit in a first phase of the cycle, step 704, and expel the plasma clusters in a second phase of the cycle, step 706, introducing momentum change into the air in the interior chamber for exit through the nozzle outlet to produce thrust, step 708. Thrust produced by the nozzle can be controlled by varying the frequency, wave shape and amplitude of the periodic voltage signal, step 710.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A plasma propulsion nozzle comprising:
   a cylinder having an inlet and an outlet;
   a plurality of substantially cylindrical electrodes;
   a plurality of dielectric spacers, each dielectric spacer being sandwiched between two of the plurality of cylindrical electrodes,
   wherein the plurality of cylindrical electrodes and dielectric spacers are cascaded in an array which is concentrically expanding from the inlet to the outlet forming an interior chamber having a conical shape; and,
   a voltage source configured to apply a periodic signal with rapidly reversing polarity to the plurality of cylindrical electrodes with differential phase applied to adjacent electrodes in the array creating and expelling plasma clusters at each dielectric spacer and inducing flow through the outlet to produce thrust.

2. The plasma propulsion nozzle of claim 1 wherein the electrodes are between 200 microns and 1 millimeter in thickness.

3. The plasma propulsion nozzle of claim 1 wherein the dielectric spacers are between 20 to 200 microns in thickness.

4. The plasma propulsion nozzle of claim 1 wherein the periodic signal of the voltage source is between 0.01-30 kHz.

5. The plasma propulsion nozzle of claim 1 wherein the voltage source supplies between 200 volts and 2 kV.

6. A method for thrust generation with a plasma propulsion nozzle having an array of substantially cylindrical electrodes and a plurality of dielectric spacers, each dielectric spacer being sandwiched between two of the plurality of cylindrical electrodes, cascaded to be concentrically expanding from an inlet through an interior chamber to an outlet forming and interior chamber having a conical shape, comprising:
   introducing air through the inlet into the interior chamber of the conical shape;
   applying a periodic voltage signal with rapidly reversing polarity to the plurality of electrodes to provide a differential voltage between paired electrodes in adjacent plasma generation units;
   creating torroidal plasma clusters at each plasma generation unit in a first phase; and
   expelling the plasma clusters in a second phase introducing momentum change into the air in the interior chamber for exit through the outlet to produce thrust.

7. The method of claim 6 further comprising controlling thrust produced by the nozzle by varying the periodic voltage signal.

8. The method of claim 7 wherein varying the periodic voltage signal comprises varying the frequency of the periodic voltage signal.

9. The method of claim 7 wherein varying the periodic voltage signal comprises varying the wave shape of the periodic voltage signal.

10. The method of claim 7 wherein varying the periodic voltage signal comprises varying the amplitude of the periodic voltage signal.

11. An unmanned air vehicle comprising:
    a blended wing body;
    at least one plasma propulsion nozzle attached to the wing body having
    a cylinder including an inlet and an outlet;
    a plurality of substantially cylindrical electrodes;
    a plurality of dielectric spacers, each dielectric spacer being sandwiched between two of the plurality of cylindrical electrodes, cascaded in an array which is concentrically expanding from the inlet to the outlet forming an interior chamber having a conical shape; and
    a voltage source configured to apply a periodic signal with rapidly reversing polarity to the plurality of cylindrical electrodes with differential phase applied to adjacent electrodes in the array creating and expelling plasma clusters at each dielectric spacer inducing flow from the nozzle outlet to produce thrust.

12. The unmanned air vehicle as defined in claim 11 wherein the at least one plasma propulsion nozzle comprises a plurality of plasma propulsion nozzles mounted to an upper surface of the wing body.

13. The unmanned air vehicle as defined in claim 11 wherein the at least one plasma propulsion nozzle comprises a first plurality of plasma propulsion nozzles mounted to an upper surface of the wing body and a second plurality of plasma propulsion nozzles mounted to a lower surface of the wing body.

14. The unmanned air vehicle as defined in claim 11 wherein the at least one plasma propulsion nozzle is mounted in a nozzle bay in the wing body.

15. The unmanned air vehicle as defined in claim 11 wherein the at least one plasma propulsion nozzle comprises two plasma propulsion nozzles, one mounted on each wing tip of the wing body.

* * * * *